United States Patent
Song et al.

(10) Patent No.: US 10,735,773 B2
(45) Date of Patent: Aug. 4, 2020

(54) VIDEO CODING TECHNIQUES FOR HIGH QUALITY CODING OF LOW MOTION CONTENT

(71) Applicant: Apple Inc., Cupertino, CA (US)

(72) Inventors: Peikang Song, San Jose, CA (US); Jae Hoon Kim, San Jose, CA (US); Xiaosong Zhou, Campbell, CA (US); Chris Y. Chung, Sunnyvale, CA (US); Hsi-Jung Wu, San Jose, CA (US); Dazhong Zhang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 14/730,975

(22) Filed: Jun. 4, 2015

(65) Prior Publication Data

US 2016/0360230 A1  Dec. 8, 2016

(51) Int. Cl.
*H04N 19/85* (2014.01)
*H04N 19/117* (2014.01)
*H04N 19/137* (2014.01)
*H04N 19/132* (2014.01)
*H04N 19/172* (2014.01)

(52) U.S. Cl.
CPC ......... *H04N 19/85* (2014.11); *H04N 19/117* (2014.11); *H04N 19/132* (2014.11); *H04N 19/137* (2014.11); *H04N 19/172* (2014.11)

(58) Field of Classification Search
CPC .................................................... H04N 19/85
See application file for complete search history.

(56) References Cited

U.S. PATENT DOCUMENTS

| | | | | |
|---|---|---|---|---|
| 6,160,586 A | * | 12/2000 | Justiss | H04N 19/105 348/452 |
| 6,208,699 B1 | * | 3/2001 | Chen | H04L 1/20 375/340 |
| 7,280,708 B2 | | 10/2007 | Song et al. | |
| 8,203,617 B2 | * | 6/2012 | Rossholm | H04N 19/61 348/222.1 |
| 2004/0252230 A1 | * | 12/2004 | Winder | H04N 5/145 348/402.1 |
| 2005/0201627 A1 | * | 9/2005 | Liang | H04N 19/197 382/239 |
| 2007/0074266 A1 | * | 3/2007 | Raveendran | H04N 5/144 725/135 |
| 2009/0074084 A1 | | 3/2009 | Drezner et al. | |
| 2009/0086814 A1 | * | 4/2009 | Leontaris | H04N 19/105 375/240.02 |

(Continued)

*Primary Examiner* — Ayman A Abaza
*Assistant Examiner* — Hesham K Abouzahra
(74) *Attorney, Agent, or Firm* — BakerHostetler

(57) ABSTRACT

Techniques for coding video data are described that maintain high precision coding for low motion video content. Such techniques include determining whether a source video sequence to be coded has low motion content. When the source video sequence contains low motion content, the video sequence may be coded as a plurality of coded frames using a chain of temporal prediction references among the coded frames. Thus, a single frame in the source video sequence is coded as a plurality of frames. Because the coded frames each represent identical content, the quality of coding should improve across the plurality of frames. Optionally, the disclosed techniques may increase the resolution at which video is coded to improve precision and coding quality.

28 Claims, 5 Drawing Sheets

(56) References Cited

U.S. PATENT DOCUMENTS

| | | |
|---|---|---|
| 2010/0278236 A1 | 11/2010 | Yang et al. |
| 2010/0329340 A1* | 12/2010 | Nemiroff ............... H04N 19/61 |
| | | 375/240.16 |
| 2011/0228852 A1* | 9/2011 | Budagavi ............. H04N 19/105 |
| | | 375/240.16 |
| 2013/0339997 A1* | 12/2013 | Farkash ........... H04N 21/23439 |
| | | 725/31 |
| 2014/0362182 A1* | 12/2014 | He .......................... G06T 9/008 |
| | | 348/43 |

* cited by examiner

100

200

300

400

500

600

700

800

VIDEO CODING TECHNIQUES FOR HIGH QUALITY CODING OF LOW MOTION CONTENT

BACKGROUND

The present disclosure relates to video coding and, in particular, to video coding techniques that apply to video having low motion content.

Many modern electronic devices support exchange of video between them. In many applications, a first device captures video locally by an electronic camera and processes the captured video for transmission to another device via a bandwidth-limited channel. The video typically has a predetermined frame size and frame rate which does not change during the video exchange process. Several coding protocols have been defined to support video compression and decompression operations. They include, for example, the ITU H.263, H.264 and H.265 standards.

The inventors foresee that video exchange may expand to include exchange of video generated by other techniques, such as video generated by a user interface of a device or video generated by an application program. In a simple example, a user at a first terminal may desire simply to exchange contents of his device's display with another user. A video coding system, therefore, may be called to code contents of a workspace on the device's display and transmit the coded data to another device. Doing so raises unique challenges that are not adequately handled by traditional coding protocols.

Traditional coding protocols involve lossy compression techniques. The process of coding video data and decoding it includes errors which means that decoded video data generated by a decoding device will resemble the source video from which it was generated but with some distortion. When coding "natural" video (e.g., video captured by a camera), such distortions are not always perceptible due to movement in image content or other factors. When coding computer-generated content, however, particularly low motion content, such distortions likely will be more perceptible because the content and, therefore, the distortions are displayed to a viewer for a prolonged period of time.

The problems of compression losses increase for higher resolution content. When coding natural content that possesses motion, a human viewer may perceive coding at one resolution (say, 720p) to be of sufficiently high quality. When coding synthetic content that has low motion, however, the same viewers may perceive coding at that same resolution to be low quality, again, because codding errors and distortion become more evident. Viewers may require decoded video data to be of a higher resolution, perhaps 1080p or 4K resolution, to maintain sufficient quality.

Accordingly, the inventors perceive a need in the art for coding techniques that process low motion content in video with high precision. The inventors further perceive a need in the art for coding techniques that recognize when low motion content is present in video and adapt processing techniques to increase precision and improve coding quality.

DETAILED DESCRIPTION

Embodiments of the present disclosure provide techniques for coding video data in which a determination is made whether a source video sequence to be coded has low motion content. When the source video sequence contains low motion content, the video sequence may be coded as a plurality of coded frames using a chain of temporal prediction references among the coded frames. Thus, a single frame in the source video sequence is coded as a plurality of frames. Because the coded frames each represent identical content, the quality of coding should improve across the coded frames. Ideally, such coding quality would achieve a no-loss coding such that the receiving terminal ultimately would decode reconstructed video that is a pixel-by-pixel match with the source video.

Figure 1:
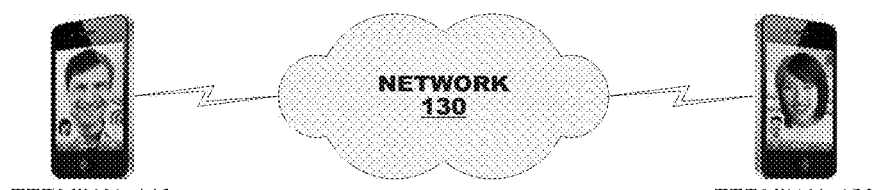
FIG. 1 is a simplified block diagram of an encoder/decoder system according to an embodiment of the present disclosure.

FIG. 1 is a simplified block diagram of an encoder/decoder system 100 according to an embodiment of the present disclosure. The system 100 may include first and second terminals 110, 120 interconnected by a network 130. The terminals 110, 120 may exchange coded video data with each other via the network 130, either in a unidirectional or bidirectional exchange. For unidirectional exchange, a first terminal 110 may capture video data from a local environment, code it and transmit the coded video data to a second terminal 120. The second terminal 120 may decode the coded video data that it receives from the first terminal 110 and may display the decoded video at a local display. For bidirectional exchange, both terminals 110, 120 may capture video data locally, code it and transmit the coded video data to the other terminal. Each terminal 110, 120 also may decode the coded video data that it receives from the other terminal and display it for local viewing.

Although the terminals 110, 120 are illustrated as smartphones in FIG. 1, they may be provided as a variety of computing platforms, including servers, personal computers, laptop computers, tablet computers, media players and/or dedicated video conferencing equipment. The network 130 represents any number of networks that convey coded video data among the terminals 110, 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 are immaterial to the present disclosure unless discussed hereinbelow.

Figure 2:
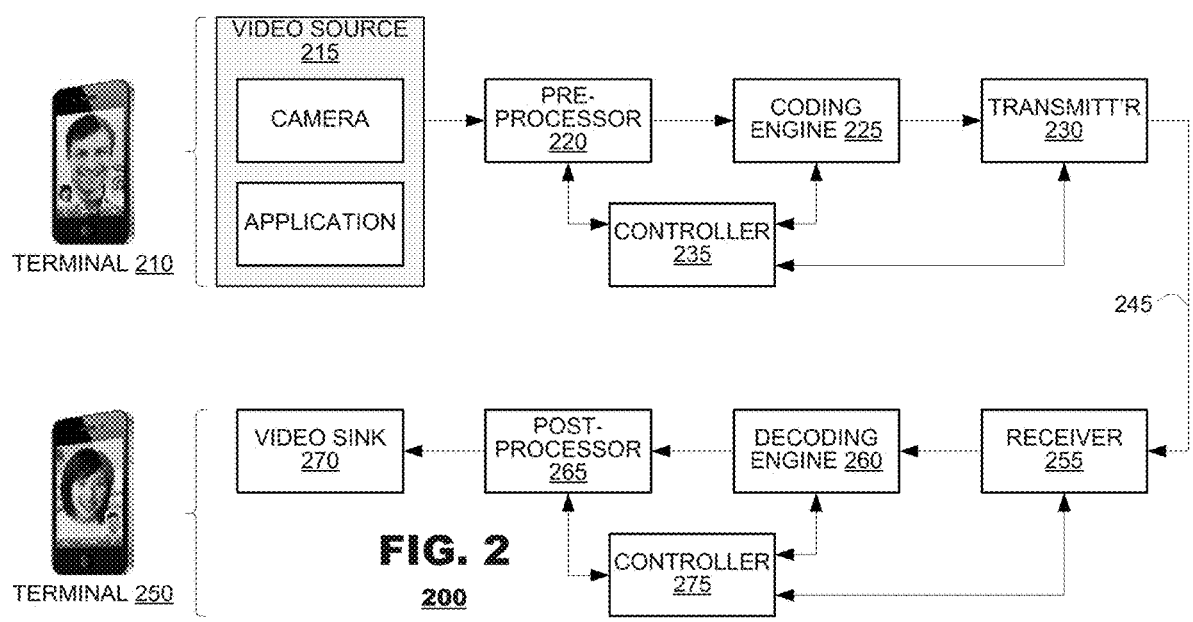
FIG. 2 is a functional block diagram of a terminal that performs video coding according to an embodiment of the present disclosure.

FIG. 2 is a functional block diagram of terminals 210, 250 that perform video coding and decoding according to an embodiment of the present disclosure. A first terminal 210 may include a video source 215, a preprocessor 220, a coding engine 225, a transmitter 230 and a controller 235. The video source 215 may generate a video sequence for coding. The preprocessor 220 may perform various processing operations that condition the input signal for coding. The coding engine 225 may perform data compression operations to reduce the bitrate of the video sequence output from the preprocessor 220. The transmitter 230 may transmit coded video data to another terminal 250 via a channel 245 provided by a network. The controller 235 may coordinate operation of the terminal 210 as it performs these functions.

Typical video sources 215 include image capture systems, such as cameras, that generate video from locally-captured image information. They also may include applications that execute on the terminal 210 and generate image information to be exchanged with a far-end terminal 250. Alternatively, the video source 215 may include storage devices (not shown) in which video may be stored, e.g., the video was generated at some time prior to the onset of a coding session. Thus, source video sequences may represent naturally-occurring image content or synthetically-generated image content (e.g., computer generated video), as application needs warrant. The video source may provide source video to other components within the terminal 210.

As indicated, the preprocessor 220 may perform video processing operations upon the camera video data to improve quality of the video data or to condition the video data for coding. The preprocessor 220 also may perform analytical operations on the video that it receives from the video source 215 to determine, for example, a size of the video, frame rate of the data, rates of change of content within the video, and the like. The preprocessor 220 may distinguish portions of an input video sequence that possess low motion content from other portions of the video sequence that possess moving content. Optionally, the preprocessor 220 may perform other processes to improve quality of the video data such as motion stabilization and/or filtering. Filtering operations may include spatial filtering, temporal filtering, and/or noise detection and removal.

The coding engine 225 may code frames of video data to reduce bandwidth of the source video. In an embodiment, the coding engine 225 may perform preprocessing, content prediction and coding. Preprocessing operations typically condition a video sequence for subsequent coding. Typical preprocessing may include filtering operations that alter the spatial and/or temporal complexity of the source video, resizing operations that alter the size of frames within the source video and frame rate conversion operations that alter the frame rate of the source video. In embodiments, involving scalable coding, the coding engine may generate and then code a base layer stream and one or more enhancement layer streams that represent the source video. Such preprocessing operations may vary dynamically according to operating states of the terminal 210, operating states of the network 130 (FIG. 1) and/or operating states of a second terminal 250 that receives coded video from the first terminal 210.

Prediction and coding operations may reduce the bandwidth of the video sequence by exploiting redundancies in the source video's content. For example, coding may use content of one or more previously-coded "reference frames" to predict content for a new frame to be coded. Such coding may identify the reference frame(s) as a source of prediction in the coded video data and may provide supplementary "residual" data to improve image quality obtained by the prediction. Coding may operate according to any of a number of different coding protocols, including, for example, MPEG-4, H.263, H.264 and/or HEVC. Such coding operations typically involve executing a transform on pixel data to another data domain as by a discrete cosine transform or a wavelet transform, for example. Transform coefficients further may be quantized by a variable quantization parameter and entropy coding. Each protocol defines its own basis for parsing input data into pixel blocks prior to prediction and coding. The principles of the present disclosure may be used cooperatively with these approaches.

The coding operations may include a local decoding of coded reference frame data (not shown). Many predictive coding operations are lossy operations, which causes decoded video data to vary from the source video data in some manner. By decoding the coded reference frames, the terminal 210 stores a copy of the reference frames as they will be recovered by the second terminal 250.

The transmitter 230 may format the coded video data for transmission to another terminal. Again, the coding protocols typically define a syntax for exchange of video data among the different terminals. Additionally, the transmitter 230 may package the coded video data into packets or other data constructs as may be required by the network. Once the transmitter 230 packages the coded video data appropriately, it may release the coded video data to the network 130 (FIG. 1).

The coding engine 225 may select various coding parameters based on constraints that may be imposed upon it by a controller 235. For example, the coding engine 225 may select coding modes for frames and pixel blocks (for example, selection among inter-coding and intra-coding), quantization parameters and other coding parameters for various portions of the video sequence. The coding engine 225 may perform the coding operations described herein in FIGS. 3-7 to code low motion content with higher precision. The controller 235 may impose constraints on the coding engine 225 by selecting, for example, a target bit rate that the coded video must meet and/or a metric of image quality that must be met when the coded video is decoded. In this manner, the elements of the coding engine 225 operate cooperatively with the controller 235.

FIG. 2 also illustrates functional units of a second terminal 250 that decodes coded video data according to an embodiment of the present disclosure. The terminal 250 may include a receiver 255, a decoding engine 260, a post-processor 265, a video sink 270 and a controller 275. The receiver 255 may receive coded video data from the channel 245 and provide it to the decoding engine 260. The decoding engine 260 may invert coding operations applied by the first terminal's coding engine 225 and may generate recovered video data therefrom. The post-processor 265 may perform signal conditioning operations on the recovered video data from the decoding engine 260, including dynamic range mapping as discussed below. The video sink 270 may render the recovered video data. The controller 275 may manage operations of the terminal 250.

As indicated, the receiver 255 may receive coded video data from a channel 245. The coded video data may be included with channel data representing other content, such as coded audio data and other metadata. The receiver 255 may parse the channel data into its constituent data streams and may pass the data streams to respective decoders (not shown), including the decoding engine 260.

The decoding engine 260 may generate recovered video data from the coded video data. The decoding engine 260 may perform prediction and decoding processes. For example, such processes may include entropy decoding, re-quantization and inverse transform operations that may have been applied by the coding engine 225. The decoding engine 260 may build a reference picture cache to store recovered video data of the reference frames. Prediction processes may retrieve data from the reference picture cache to use for predictive decoding operations for later-received coded frames. The coded video data may include motion vectors or other identifiers that identify locations within previously-stored reference frames that are prediction references for subsequently-received coded video data. Decoding operations may operate according to the coding protocol applied by the coding engine 225 and may comply with MPEG-4, H.263, H.264 and/or HEVC.

The post-processor 265 may condition recovered frame data for rendering. As part of its operation, the post-processor 265 may perform dynamic range mapping as discussed hereinbelow. Optionally, the post-processor 265 may perform other filtering operations to improve image quality of the recovered video data.

The video sink 270 represents units within the second terminal 250 that may consume recovered video data. In an embodiment, the video sink 270 may be a display device. In other embodiments, however, the video sink 270 may be provided by applications that execute on the second terminal 250 that consume video data. Such applications may include, for example, video games and video authoring applications (e.g., editors).

FIG. 2 illustrates functional units that may be provided to support unidirectional transmission of video from a first terminal 210 to a second terminal 250. In many video coding applications, bidirectional transmission of video may be warranted. The principles of the present disclosure may accommodate such applications by replicating the functional units 215-235 within the second terminal 250 and replicating the functional units 255-275 within the first terminal 210. Such functional units are not illustrated in FIG. 2 for convenience.

Embodiments of the present disclosure find application when coding data that effectively has non-uniform frame rate, either because it is supplied from the video sink at a variable rate or because, although supplied from the video sink at a constant rate, content within the supplied video has low motion for prolonged periods of time. Consider, for example, an application that generates image content in an application window. An application's image content may remain at low motion at various times, such as when the application awaits user input. Such times may persist for several seconds or more. When a viewer at a far end terminal reviews the application's image content, any image loss that is incurred by operation of the coding engine 225 and the decoding engine 260 may be particularly noticeable to the viewer.

Figure 3:
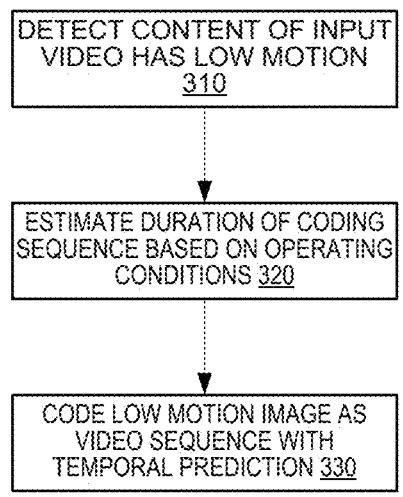
FIG. 3 illustrates a method according to an embodiment of the present disclosure.

FIG. 3 illustrates a method 300 according to an embodiment of the present disclosure. The method 300 may begin when the method determines that the content of input video to be coded has low motion (box 310). In such a condition, the method 300 may estimate a duration of a coding sequence to be used for coding the low motion content based on an operating condition at the coding terminal (box 320). The method 300 then may code the low motion content as a video sequence using a temporal prediction (box 330).

Low motion content may be recognized in a variety of ways. In one embodiment, an application may output video data to the preprocessor at a variable frame rate. This frame rate may drop to zero when video content has become static or, alternatively, may include metadata in output video indicating that the video content is static. Accordingly, a preprocessor 220 (FIG. 2) may determine that static video content is present when an active frame rate of video output from a video source 215 is zero. Similarly, when the application's output frame rate drops below a predetermined threshold representation a natural frame rate (e.g., to something about 5 fps or less), a preprocessor 220 may determine that the application is operating in a low motion state.

In another embodiment, a preprocessor 220 (FIG. 2) may detect low motion video content from a comparison of content of video at different times. For example, a preprocessor 220 may retrieve source video from a predetermined memory location in the system (not shown), such as a graphics buffer or the like, at a predetermined retrieval rate. The preprocessor 220 may analyze content of the received video as it is read from memory to identify whether the content has changed between successive reads. When the content does not change, the preprocessor 220 may determine that the content has low motion. In an embodiment, the preprocessor 220 also may filter or downsample the image content, in order to remove small frame-to-frame differences in content, prior to performing motion detection.

In a further embodiment, an application may provide video to the preprocessor 220 (FIG. 2) at a consistent frame rate and, again, the preprocessor 220 may analyze the video for frame-to-frame changes in content. When the content does not change, the preprocessor 220 may determine that the content has low motion. In this latter embodiment, if the preprocessor 220 has determined that content has remained at low motion for some threshold amount of time, the preprocessor 220 may signal to the application that it will cease accepting video from the application until the application changes its video output. In such an embodiment, the application "wakes up" the preprocessor 220 when its video output changes. Such an embodiment conserves processing resources in a terminal that otherwise would be spent to analyze input video and determine whether the video contains low motion content or not.

Figure 4:
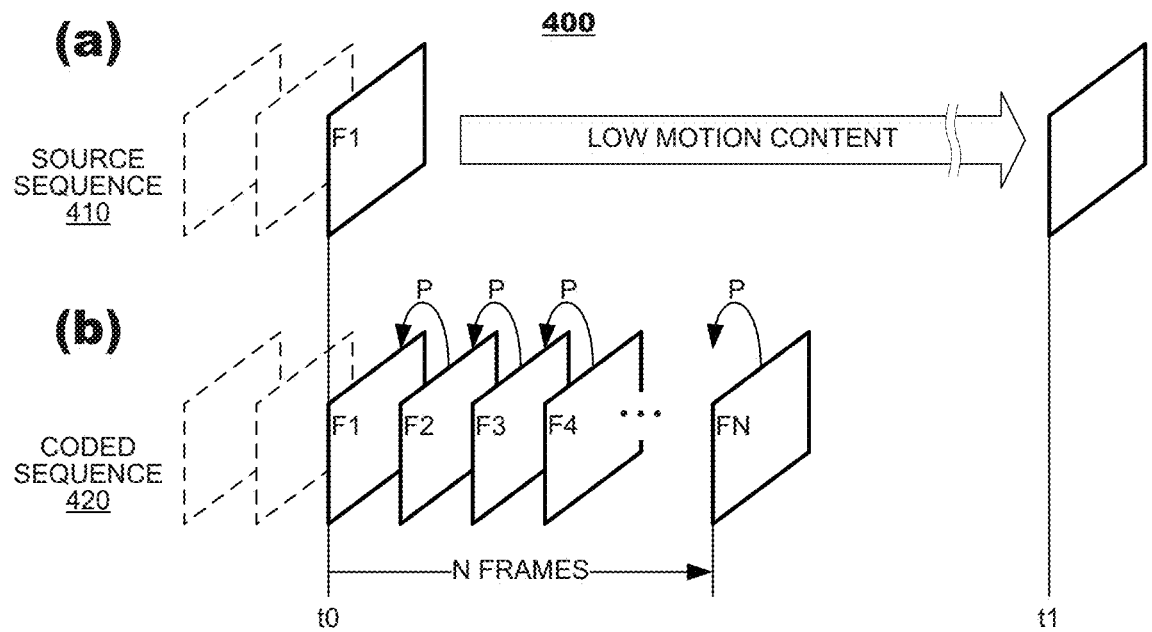
FIG. 4 illustrates exemplary image data that may be coded according to an embodiment of the present disclosure.

FIG. 4 illustrates exemplary image data 400 that may be coded according to the method of FIG. 3. FIG. 4(a) represents a sequence of source content 410 that may be presented to a coding engine for coding. In this example, the source sequence 410 may be identified as having low motion at a time t0 (frame F1). It may remain at low motion through to a later time t1 when content of the source sequence 410 exhibits new changes.

FIG. 4(b) illustrates coding operations that may be used to code a frame F1 that represents the low motion content in the source sequence 410. The frame F1 from the source sequence 410 may be coded according to motion-compensated prediction as a plurality of frames F1-FN in a coded sequence 420. Each of the frames F1-FN may have identical content to the frame F1 from the source sequence 410. Each of the frames F1-FN may be coded predictively using an adjacent frame as a prediction reference (e.g., frame F2 is shown coded as a P frame using coded frame F1 as a prediction reference). Because the image content does not change over the frame sequence F1-FN, coding quality likely will improve over the sequence F1-FN, leading to a final coded frame FN that closely resembles source frame F1.

The method 300 may select the length N of the sequence F1-FN adaptively based on operating conditions at the coding terminal. For example, a coding terminal may estimate the number N of frames based on an estimate of network bandwidth that is available for the coding session, an estimate of complexity of content in the frame F1, processing resources available for video coding by the coding terminal, and the like.

Figure 5:
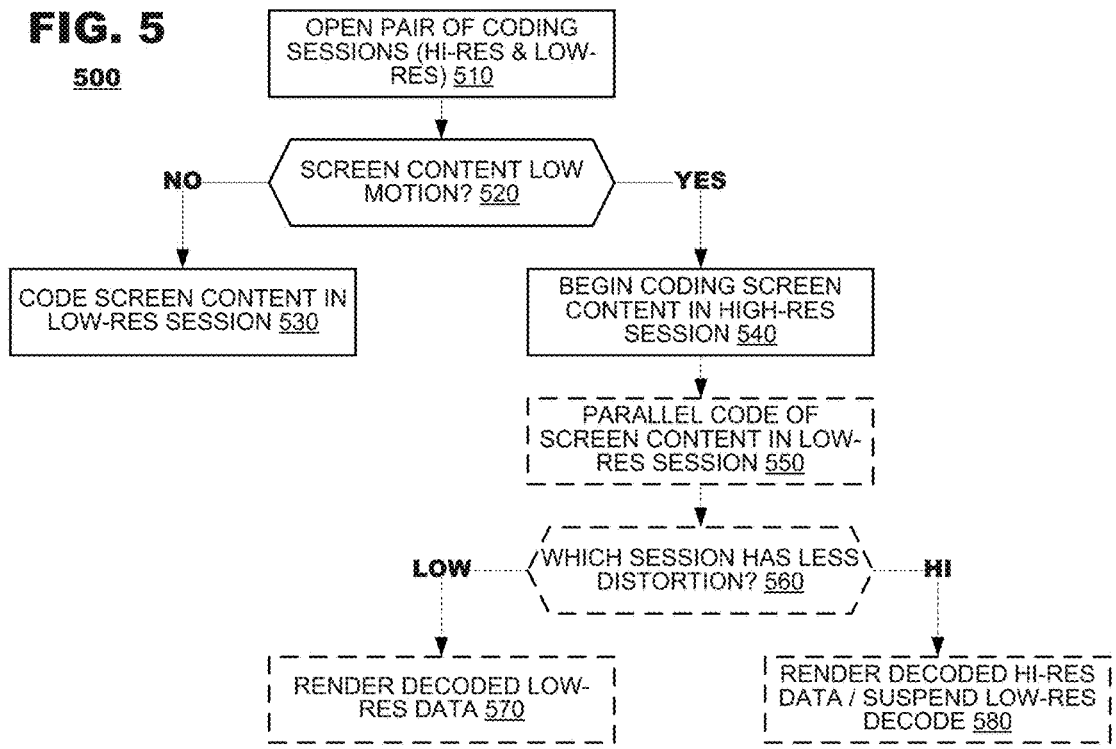
FIG. 5 illustrates a method according to another embodiment of the present disclosure.

FIG. 5 illustrates a method 500 according to another embodiment of the present disclosure. According to the method 500, a coding terminal may initiate a pair of coding sessions with a far end terminal (box 510). A first coding session may carry coded video data at a first resolution (say 1080p) and a second coding session may carry coded video data at a second resolution (for example, 4k), which is higher than the first resolution. Thus, the sessions may carry "low resolution" video and "high resolution" video, respectively.

The method 500 may determine whether the source video is low motion or not (box 520). When the method 500 determines that source video is not low motion, it may have the video coded as part of the low-resolution session (box 530). When the method 500 determines that the source video is low motion, however, it may have the video coded as part of the high-resolution session (box 540). Coding by the high-resolution session likely will yield coded video that, when decoded, has less distortion than coding by the low-resolution session. Thus, when a low motion content condition is detected, switching to the high-resolution session likely will generate higher quality coding.

A coder need not switch over to a high-resolution session immediately when a low motion condition is detected. In an embodiment, the method 500 may cause source video data to be coded in both sessions in parallel when the low motion condition is detected (boxes 540, 550). The coded video data for both sessions may be transmitted to a far end terminal. The method 500 may estimate which of the coded representations will generate less distortion on decode (box 560). If the method determines that the low-resolution coding generates less distortion, it may provide an indication to the far end terminal that the low-resolution coding is to be used on decoding (box 570). If, however, the method 500 determines that the high-resolution coding generates less distortion, the method 500 may provide an indication to the far end terminal that the high-resolution coding is to be used on decoding and suspend low-resolution decoding (box 580). This embodiment finds application in scenarios where a high-resolution coding begins with a coding quality that is lower than the coding quality of the low-resolution coding but, over time, coding quality of the high-resolution coding improves and ultimately becomes better than the coding quality of the low-resolution coding. The decision to switch over between the low-resolution decoded representation and the high-resolution decoded representation can be made either by an encoder or, in another embodiment, by a decoder.

Figure 6:
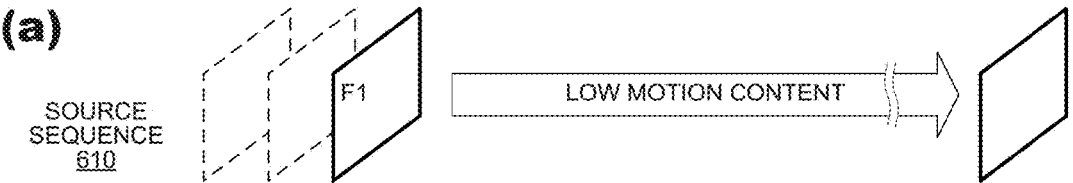
FIG. 6 illustrates an exemplary source video sequence and exemplary coding sessions that may be generated therefrom according to an embodiment of the present disclosure.
Figure 6:
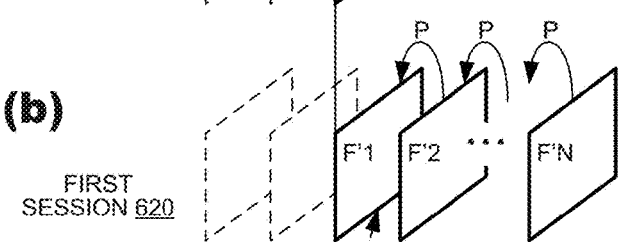
Figure 6:
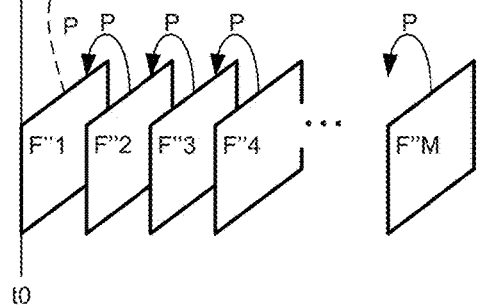

FIG. 6 illustrates an example 600 of a source video sequence 610 to be coded and exemplary first and second coding sessions 620, 630 that may be generated according to the method of FIG. 5. FIG. 6(a) illustrates a source video sequence 610 that includes a plurality of frames. At some point in the video sequence, illustrated at time t0 (frame F1), the content of the source video sequence 610 becomes low motion.

FIGS. 6(b) and (c) illustrate exemplary coding sessions 620, 630 that may support coding of the source video sequence 610. The first session 620 may support coding of the source video sequence, both frames that precede the low motion frame F1 and frame F1 itself. As in the embodiment of FIGS. 3 and 4, the low motion frame F1 may be coded in the first session 620 as a plurality of frames F'1-F'N by a continuous chain of prediction references.

The second coding session 630 may support coding of the low motion frame F1 at a higher resolution than the first coding session 620. The second coding session 630 need not carry coded video representing a portion of the source video sequence 610 that precedes the low motion frame F1. When the low motion frame F1 is encountered, however, the second coded session 630 may carry coded video data F'''1-F'''M representing the low motion frame F1. As with the coded video data of the first session 620, the coded frames of the second session 630 may be coded using a continuous prediction chain between adjacent frames. In this manner, the coding quality of the coded frames F'''1-F'''M should improve incrementally until a coded frame (shown as frame F'''M) achieves a predetermined level of coding quality.

In an embodiment, the first frame F'''1 of the second coding session 630 may be coded predictively from a frame F'1 of the first coding session 620. Where image data in the two sessions have different resolutions, a reference picture (frame F'1) in the first session 620 may be upscaled to a resolution that matches the frame size of the second session 630. In this manner, a bit rate of the second coding session may be reduced.

As discussed in connection with FIG. 5, the second coding session 630 may support higher resolution than the first coding session 620. Nevertheless, it is possible that initial frames (say frames F'''1-F'''3) may be coded at a lower coding quality than corresponding frames F'1-F'3 of the first coding session 620 because a coding state of the second session has not been established 630 when the low motion frame F1 was encountered. Over time, however, coding quality of the second coding session 630 should exceed coding quality of the first coding session 620.

An encoder may measure distortion of decoded video data that will be obtained by decoding coded video data of the first and second coding sessions 620, 630 and may determine when coding quality of the second session 630 overtakes coding quality of the first session 620. When coding quality of the second session 630 exceeds that of the first session 620, the encoder may suspend coding via the first session 620 but continue coding via the second session 630. At some point, coding quality of the second session 630 may reach a predetermined quality threshold and the encoder may suspend coding via the second session 630, also.

At some point, new video content may occur in the source video sequence (shown at time t1). When the video content ceases to be low motion, coding may resume in the first session 620 and may be suspended in the second session 630.

Figure 7:
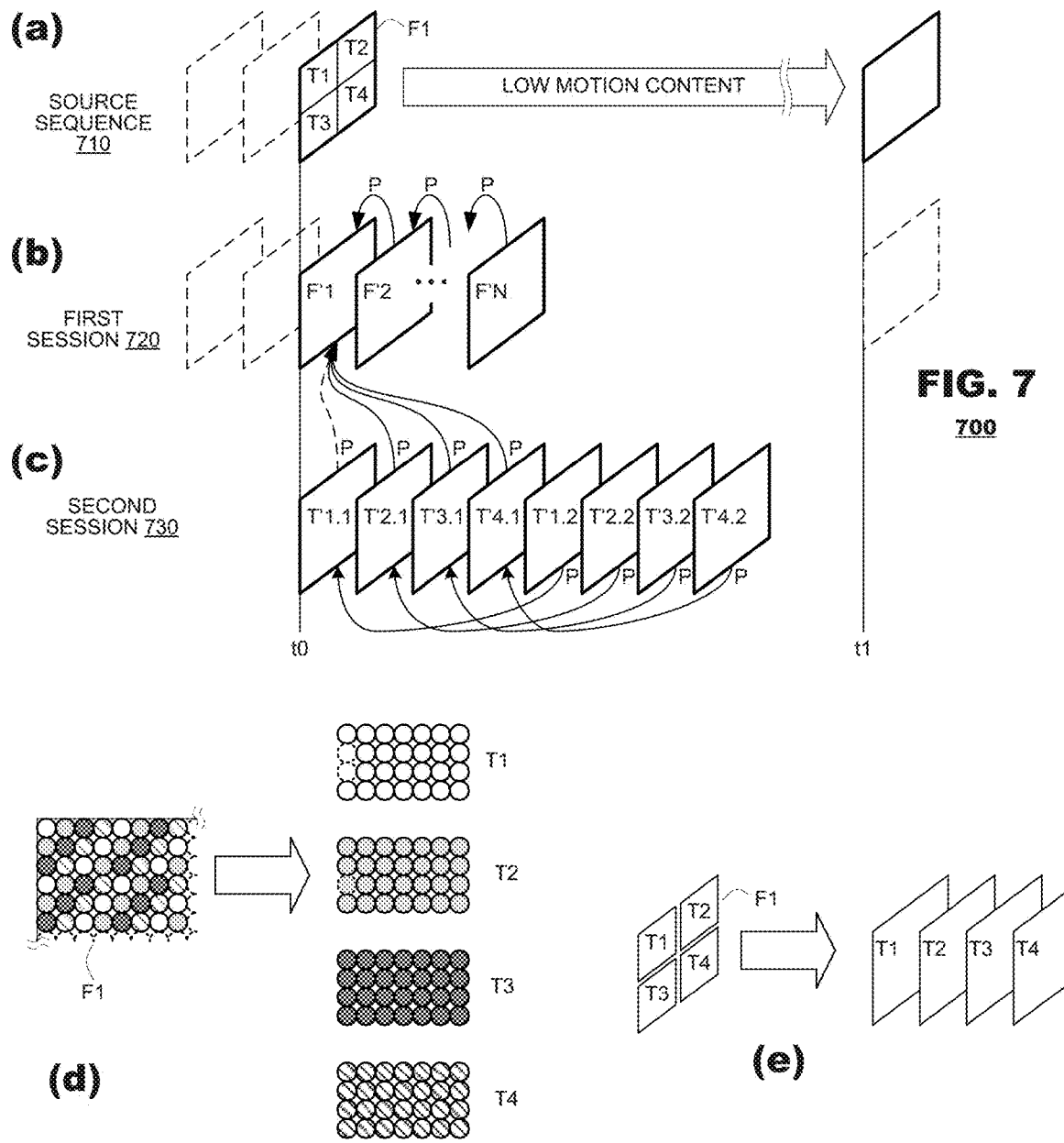
FIG. 7 illustrates an exemplary source video sequence and exemplary coding sessions that may be generated therefrom according to another embodiment of the present disclosure.

FIG. 7 illustrates another example 700 of a source video sequence 710 to be coded and exemplary first and second coding sessions that may be generated according to the method of FIG. 5. FIG. 7(a) illustrates a source video sequence 710 that includes a plurality of frames. At some point in the video sequence, illustrated at time t0 (frame F1), the content of the source video sequence becomes low motion.

FIGS. 7(b) and (c) illustrate exemplary coding sessions 720, 730 that may support coding of the source video sequence 710. The first session 720 may support coding of the source video sequence 710, both frames that precede the low motion frame F1 and frame F1 itself. As in the embodiment of FIGS. 3 and 4, the low motion frame F1 may be coded in the first coding session 720 as a plurality of frames F'1-F'N by a continuous chain of prediction references. Video data of the first session may be coded at a first frame size.

The second coding session 730 may support coding of the low motion frame F1 at a higher resolution than the first coding session 720. The second coding session 730 need not carry coded video representing a portion of the source sequence 710 that precedes the low motion frame F1. When the low motion frame F1 is encountered, however, the second session 730 may carry coded video data representing the low motion frame F1.

In this embodiment, the source frame F1 may be spatially distributed into "tiles" for coding in the second coding session 730. FIG. 7(*a*) illustrates a frame F1 parsed into an exemplary set of four tiles T1-T4. Frames of the second coding session 730 may have different content from each other but correspond to a predetermined tile from the source frame F1. In the example of FIG. 7, frames T'1.1 and T'1.2 in the second coding session 730 may correspond to tile T1 of the source sequence 710. Similarly, frames T'2.1, T'2.2 may correspond to tile T2, frames T'3.1 and T'3.2 may correspond to tile T3 and frames T'4.1 and T'4.2 may correspond to tile T4. During decoding, a decoder may generate recovered video corresponding to the tiles, then merge content of the tiles to generate a final decoded frame. Thus, although coded tiles in the second session 730 may have the same size as coded frames of the first session 720, the coded tiles 730 may contribute to decoded frames that are larger than the decoded frames obtained from the first session 720. And, of course, the principles of the present disclosure accommodate use of coded tiles T'1.1-T'4.1 that are larger than coded frames of the first session 720.

Distribution of content from a source frame F1 to tiles may occur in a variety of ways. A first example is illustrated in FIG. 7(*d*) where pixels from a source frame F1 are distributed to respective tiles T1-T4 according to a predetermined distribution pattern. In this example, every fourth pixel on a horizontal line is allocated to a respective tile.

A second example is illustrated in FIG. 7(*e*) where different multi-pixel regions of pixels from a source frame F1 are distributed to respective tiles T1-T4. The regions may be selected to suit individual application needs. In the example illustrated in FIG. 7(*e*), tiles are formed from different quadrants of a source frame F1. Alternatively, tiles may be formed from other units in a source frame such as macroblocks, slices, or coding units, depending on a coding protocol that governs coding.

In an embodiment, the set of tiles T'1.1, T'2.1, T'3.1 and T'4.1 of the second coding session 730 may be coded predictively from a frame F'1 of the first coding session 720. The reference frame F'1 in the first session 720 may be upscaled to a size that matches the post-decoding frame size of the second session 730 and parse in a manner that matches the distribution used to generate the tiles T'1.1, T'2.1, T'3.1 and T'4.1. In this manner, a bit rate of the second coding session may be reduced.

As discussed in connection with FIG. 5, the second coding session 730 may support higher resolution than the first coding session 720. Nevertheless, it again is possible that initial decoded frames T'1.1, T'2.1, T'3.1 and T'4.1 may be coded at a lower coding quality than corresponding frames F'1 of the first coding session 720 because the coding state of the second session 730 has not been established when the low motion frame T1 is encountered. Over time, however, coding quality of the second coding session 730 should exceed coding quality of the first coding session 720.

An encoder may measure distortion of decoded video data that will be obtained by decoding coded video data of the first and second sessions 720, 730 and may determine when coding quality of the second session 730 overtakes coding quality of the first session 720. When coding quality of the second session 730 exceeds that of the first session 720, the encoder may suspend coding via the first session 720 but continue coding via the second session 730. At some point, coding quality of the second session may reach a predetermined quality threshold and the encoder may suspend coding via the second session 730, also.

At some point, new video content may occur in the source video sequence (shown at time t1). When the video content ceases to be low motion, coding may resume in the first session 720 and may be suspended in the second session 730.

The principles of the present disclosure also find application in systems where application video is provided in a layered format. Different graphics elements may be assigned to the different layers by the application that generates them. These different layers may be coded in different video coding sessions according to the techniques described hereinabove. Thus, one graphics layer may be identified as having low motion even if another graphics layer is not, and the low motion layer may be coded according to the techniques described herein above. As one example, video output by a video game application often includes a collection of low motion image content representing status information the game (border elements, a games' score, status bars representing a character's health, UI controls, etc.) and other higher motion image content representing other game play elements; the low motion elements may be output in a first graphics layer and the high motion elements may be output in another graphics layer.

Use of the coding techniques described hereinabove may contribute to efficient coding, particularly in video streams that apply blending effects between the different graphics layers. Oftentimes, regions of blended video can be expensive to code by a video coding system. Through use of the foregoing techniques, however, each graphics layer may be coded independently of the other graphics layer, which permits the graphics layers to be coded efficiently. Following decode, a post-processor 265 (FIG. 2) may apply blending effects to the graphics layers. Thus, blending effects may be applied even though they are not coded by a coding engine 225.

Coding the different graphics layers separately from each other also permits a coding engine 225 (FIG. 2) to allocate different bit rates to the coded layers based on relative importance. For example, an application or a pre-processor 220 may identify content of one of the layers as having greater importance than other layers and bit allocations may be provisioned to provide high quality coding of that layer. Separate coding of the different layers also may provide an inherent inter-layer immunity against losses due to transmission errors and the like. Errors that arise during transmission or decoding of a first graphics layer will not affect decoding of a second graphics layer. Moreover, a terminal 210 may assign different levels of error protection coding to the different coded graphics layer, again, based on relative importance of the layers. A layer that is identified as having high importance may be assigned a relatively higher level of error protection than a layer having lower importance, which provide higher robustness in the face of transmission errors.

Figure 8:
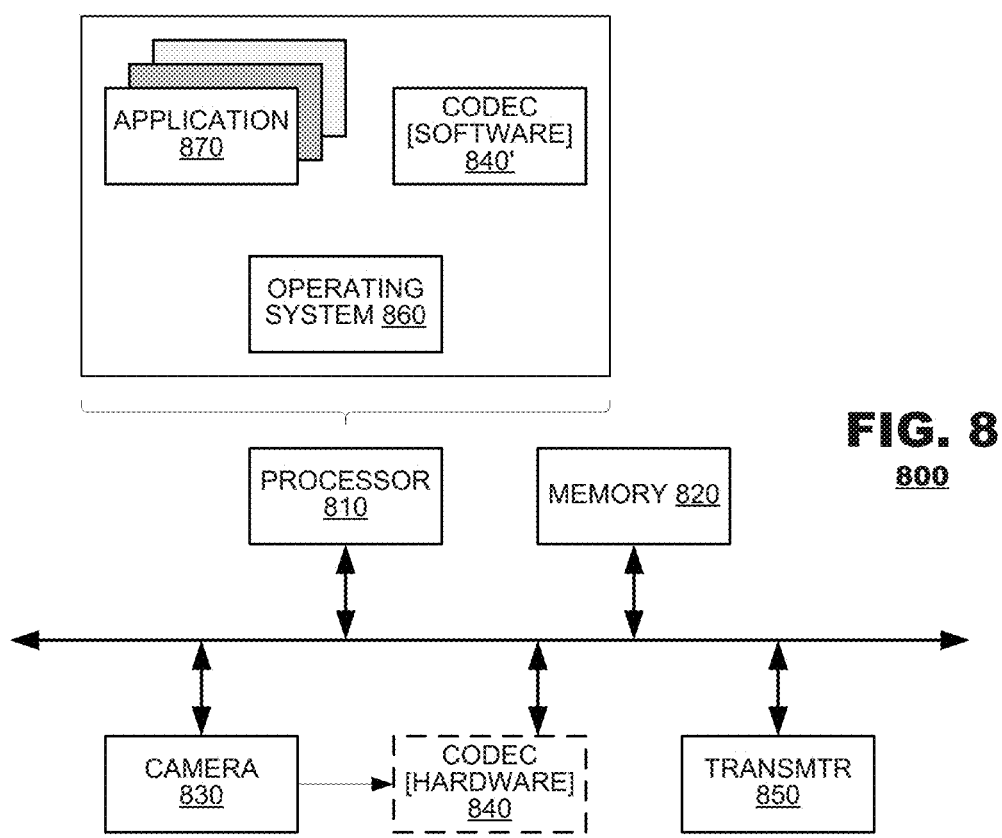
FIG. 8 is a simplified block diagram of a terminal according to an embodiment of the present disclosure.

As discussed, terminals 110, 120 (FIG. 1) may execute applications that generate video sequences to be coded and decoded by video coders and decoders. FIG. 8 is a simplified block diagram of a terminal 800 according to such an embodiment. As illustrated in FIG. 8, the terminal 800 may include a processor 810, a memory system 820, camera 830, codec 840 and transmitter 850. The memory system 820 may store instructions that define an operating system 860, application programs and application data (collectively "applications") 870 within the terminal 800. Implementations of the terminal 800 may vary; for example, the codec 840 may be provided as a hardware component within the terminal 800 separate from the processor 810 or it may be provided as an application program (labeled 840') within the terminal 800. The principles of the present disclosure find application with either embodiment.

The foregoing discussion has described operation of the embodiments of the present disclosure in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook or tablet computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronic devices, such as gaming systems, smartphones, DVD players, portable media players and the like, and they also can be packaged in consumer software applications such as video games, browser-based media players and the like.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A video coding method, comprising:
    determining whether a source video sequence has low motion content,
    when the source video sequence contains low motion content, coding a single frame from the video sequence as a sequence of substitute frames each having identical content as the single frame, the substitute frames being coded using a chain of temporal prediction references among them, each temporal prediction in the chain including a prediction reference referring to the immediately preceding frame and including coded residual data determined by differencing each temporal prediction from the single frame,
    wherein the coded residual data is produced by a lossy coder,
    wherein the coded residual data for each temporal prediction in the chain provides increasing coded image quality of the single frame over time in the sequence of substitute frames, and
    wherein,
        prior to the determination that the source video sequence contains low motion content, the source video sequence is coded at a first resolution, and
        after the determination is made that the source video sequence contains low motion content, the source video sequence is coded at a second resolution higher than the first resolution.

2. The method of claim 1, wherein the determining comprises determining that a frame rate of the source video sequence is zero.

3. The method of claim 1, wherein the determining comprises
    filtering frames of the source video sequence, and
    determining that a plurality of filtered frames has identical content.

4. The method of claim 1, wherein the source video sequence is generated by an application executing on a terminal device.

5. The method of claim 4, further comprising, when the source video sequence contains low motion content, signaling the application to suspend providing the source video sequence until the source video sequence is low motion no longer.

6. The method of claim 1, further comprising selecting a number of the plurality of coded frames based on operating conditions at an encoding terminal, wherein the coding occurs over the selected number of frames.

7. The method of claim 1, further comprising:
    prior to the determining, initiating a pair of coding sessions, a first coding session at a lower resolution than a second coding session,
    when the source video sequence does not contain low motion content, coding the non-low motion content in the first coding session, and
    when the source video sequence contains low motion content, coding the low motion content in the second coding session.

8. The method of claim 7, further comprising:
    when the source video sequence contains low motion content, determining whether a coding of the low motion content in the first coding session will achieve higher quality coding than the coding of the low motion content in the second coding session, and
    if the determination indicates that the coding of the low motion content in the first coding session will achieve higher quality coding than the coding of the low motion content in the second coding session, coding the low motion content in the first session until the coding quality of the second session exceeds the coding quality of the first session.

9. The method of claim 7, wherein the coding of the low motion content in the second coding session comprises:
    distributing portions of the low motion content to separate frames in the plurality, and
    coding the separate frames a plurality of times.

10. The method of claim 1, wherein the source video sequence is one graphics layer from a plurality of graphics layers generated by an application executing on a terminal in which the method is performed.

11. A terminal device, comprising:
    a processing system executing an application that generates video output, and
    a coding system that includes:
        a preprocessor to analyze video for coding, and
        a motion-compensation prediction-based video coder,
    wherein, responsive to a preprocessor determination that video output from the application has low motion content, the video coder codes a single frame from the video output as a sequence of substitute frames each having identical content as the single frame using a chain of temporal prediction references among them, each temporal prediction in the chain including a prediction reference referring to the immediately preceding frame and including coded residual data determined by differencing each temporal prediction from the single frame,
    wherein the coded residual data is produced by a lossy coder,
    wherein the coded residual data provides increasing coded image quality of the single frame over time in the sequence of substitute frames, and
    wherein, prior to the determination that the source video sequence contains low motion content, the source video sequence is coded at a first resolution, and after the determination is made that the source video sequence contains low motion content, the source video sequence is coded at a second resolution higher than the first resolution.

12. The terminal device of claim 11, wherein the preprocessor determines that the video output has low motion content when a frame rate of the video output is zero.

13. The terminal device of claim 11, wherein the preprocessor determines that the video output has low motion content from a comparison of content in frames of the video output.

14. The terminal device of claim 11, wherein the processing system selects a number of frames in the plurality of coded frames based on operating conditions of the terminal device.

15. The terminal device of claim 11, wherein:
prior to the preprocessor determination, the video coder initiates a pair of coding sessions, a first coding session at a lower resolution than a second coding session,
when the video output does not contain low motion content, the video coder codes the non-low motion content in the first coding session, and
when the video output contains low motion content, the video coder codes the low motion content in the second coding session.

16. The terminal device of claim 15, wherein:
when the video output contains low motion content, the video coder determines whether a coding of the low motion content in the first coding session will achieve higher quality coding than the coding of the low motion content in the second coding session, and
if the video coder determines that the coding of the low motion content in the first coding session will achieve higher quality coding than the coding of the low motion content in the second coding session, the video coder codes the low motion content in the first session until the coding quality of the second session exceeds the coding quality of the first session.

17. The terminal device of claim 15, wherein the video coder codes the low motion content in the second coding session by:
distributing portions of the low motion content to separate frames in the plurality, and coding the separate frames a plurality of times.

18. The terminal device of claim 15, wherein the video output from the application is one graphics layer from a plurality of graphics layers generated by the application.

19. A non-transitory computer readable medium storing program instructions that, when executed by a processing device, causes the processing device to code video by:
determining whether a source video sequence has low motion content,
when the source video sequence contains low motion content, coding a single frame from the video sequence as a sequence of substitute frames each having identical content as the single frame, the substitute frames being coded using a chain of temporal prediction references among them, each temporal prediction in the chain including a prediction reference referring to the immediately preceding frame and including coded residual data determined by differencing each temporal prediction from the single frame,
wherein the coded residual data is produced by a lossy coder, wherein the coded residual data provides increasing coded image quality of the single frame over time in the sequence of substitute frames, and
wherein,
prior to the determination that the source video sequence contains low motion content, the source video sequence is coded at a first resolution, and
after the determination is made that the source video sequence contains low motion content, the source video sequence is coded at a second resolution higher than the first resolution.

20. The medium of claim 19, wherein the determining comprises determining that a frame rate of the source video sequence is zero.

21. The medium of claim 19, wherein the determining comprises determining that a plurality of frames in the source video sequence has identical content.

22. The medium of claim 19, wherein the source video sequence is generated by an application executed by the processing device.

23. The medium of claim 19, further comprising selecting a number of frames in the plurality of coded frames based on operating conditions of the processing device, wherein the coding occurs over the selected number of frames.

24. The medium of claim 19, further comprising:
prior to the determining, initiating a pair of coding sessions, a first coding session at a lower resolution than a second coding session,
when the source video sequence does not contain low motion content, coding the non-low motion content in the first coding session, and
when the source video sequence contains low motion content, coding the low motion content in the second coding session.

25. The method of claim 1, further comprising:
prior to the determining, initiating a pair of coding sessions, a first coding session at a lower resolution than a second coding session,
when the source video sequence does not contain low motion content, coding the non-low motion content in the first coding session, and
when the source video sequence contains low motion content, coding the low motion content simultaneously in the first coding session and the second coding session.

26. The method of claim 25, further comprising:
determining a time when a second coding quality of the second session exceeds a first coding quality of the first session;
encoding an indication of the determined time.

27. A video coding method, comprising:
identifying a portion of a source video with low motion content;
identifying a first source frame in the identified portion;
coding the entire identified portion in a first coding session at a first resolution by repeatedly coding the first source frame as a sequence of frames, wherein the coding of every subsequent frame after the first frame in the sequence includes
predicting a subsequent frame from the immediately prior frame in the sequence,
determining a residual between the prediction of the subsequent frame and the first source frame, and
coding the residual with a lossy coder; and
coding the entire identified portion in a second coding session at a second resolution higher than the first resolution.

28. The video coding method of claim 27, wherein the first coding session codes all frame of the source video, and the second coding session codes only portions the source video with low motion.

* * * * *